INVENTORS.
D. F. LEVY
D. W. GAGLE

ATTORNEYS

INVENTORS.
D. F. LEVY
D. W. GAGLE

ATTORNEYS

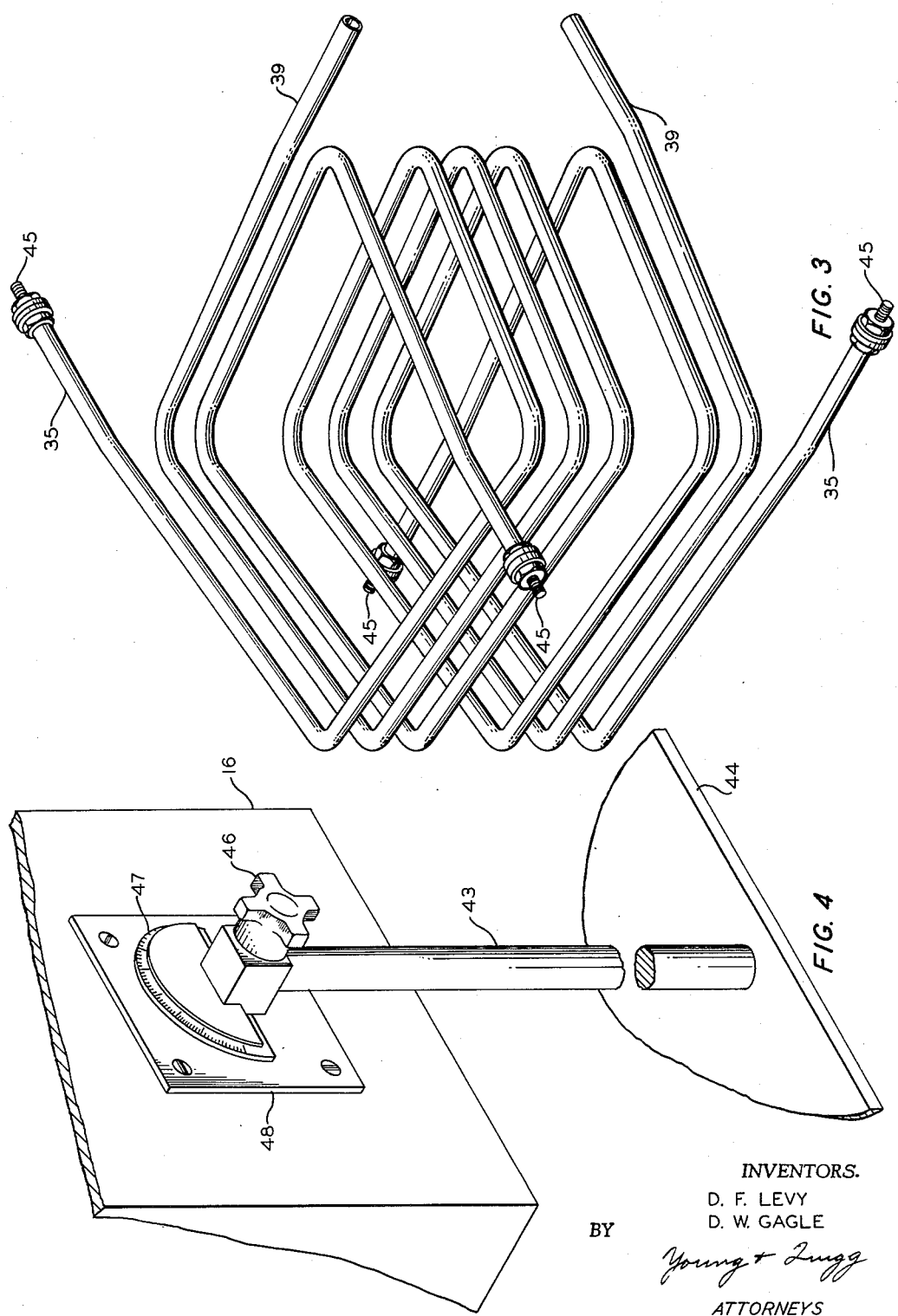

United States Patent Office 3,212,319
Patented Oct. 19, 1965

3,212,319
AGING AND CURING APPARATUS
Dale F. Levy and Duane W. Gagle, Bartlesville, Okla., assignors to Phillips Petroleum Company, a corporation of Delaware
Filed Dec. 14, 1961, Ser. No. 159,318
11 Claims. (Cl. 73—15.4)

This invention relates to aging and curing test apparatus. In one specific aspect, this invention relates to apparatus for continuously measuring the viscosity of a liquid test sample at a controlled temperature while maintaining a portion of the liquid test sample as a film exposed to accelerated simulated aging and curing conditions.

Asphaltic materials are employed to surface roadways. Asphalt, as the term is hereinafter employed, refers to a residual fraction obtained upon the distillation of certain petroleum crude oils and to a residual fraction obtained from the distillation of petroleum crude oils to which has been added a lighter petroleum fraction such as a distillate fraction or a gas oil fraction. A measure of the value of asphaltic materials as roadway surfacing materials is the effect of aging upon the asphaltic material. In addition thereto, the curing characteristics of cutback asphaltic materials are determinative of the suitability of the asphaltic material for a particular road surface. Aging denotes the change in physical or chemical properties of the asphaltic material which occur with time, brought about by air, sunlight, temperature, etc. The curing of asphaltic materials employed as roadway surfacing materials comprises the removal of the more volatile constituents of the asphaltic material.

It is desirous that testing apparatus be made available to provide a means of accurately determining the aging characteristics of the asphaltic materials, and also the curing characteristics in the case of cutback asphaltic materials, before the asphaltic materials are placed upon the roadway.

It has been discovered that the aging and curing characteristics of asphaltic materials can be determined by continuously measuring the viscosity of a small test sample while maintaining the test sample at accelerated simulated aging and curing conditions. A plot of the change in viscosity against time will provide a curve, the slope of the curve representative of the aging and curing characteristics of the asphaltic material.

We have discovered apparatus for continuously measuring the viscosity of a relatively small test sample maintained at a controlled temperature in a testing zone, continuously forming a film within said testing zone utilizing said test sample, and continuously passing a gas to said testing zone and removing a gas from said testing zone.

Accordingly, an object of our invention is to provide apparatus capable of determining the aging and curing characteristics of a test sample.

Another object of our invention is to provide apparatus for measuring the viscosity of a test sample at a controlled temperature while forming a film with a portion of said test sample.

Another object of our invention is to provide apparatus for measuring the viscosity of a test sample at a controlled temperature while forming a film with a portion of said test sample and contacting said film with a gas.

Another object of our invention is to provide an improved apparatus for determining the aging and curing characteristics of asphaltic materials.

Other objects, advantages and features of our invention will be readily apparent to those skilled in the art from the following description and appended claims.

FIGURE 3 is a perspective view of the means of controlling the temperature of the inventive apparatus.

FIGURE 4 is a perspective view of the means whereby the testing apparatus can be rotated to an inclined position.

Figure 1:
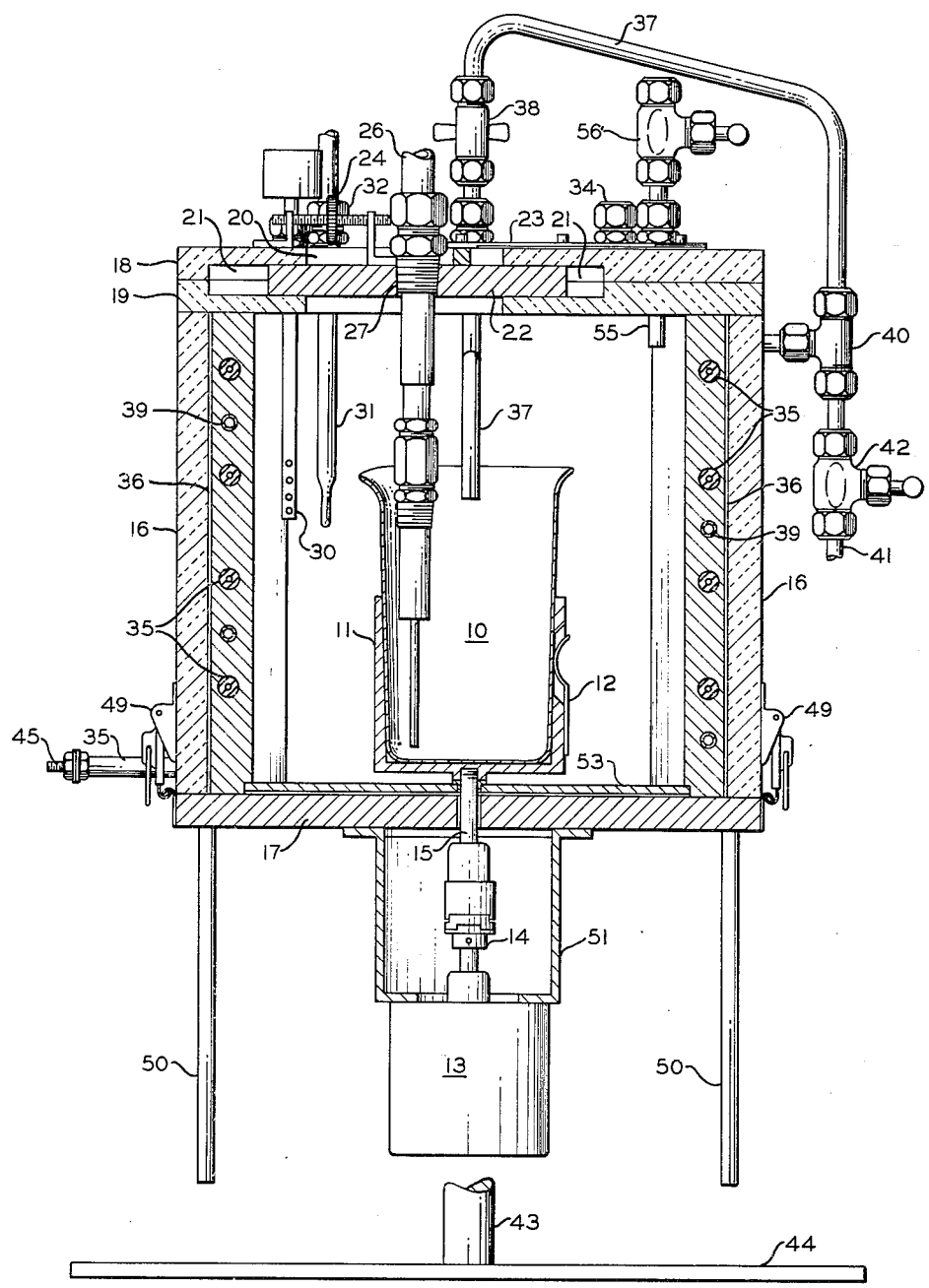
FIGURE 1 is a cross-sectional view of the inventive apparatus taken along line 1—1 of FIGURE 2.
Figure 2:
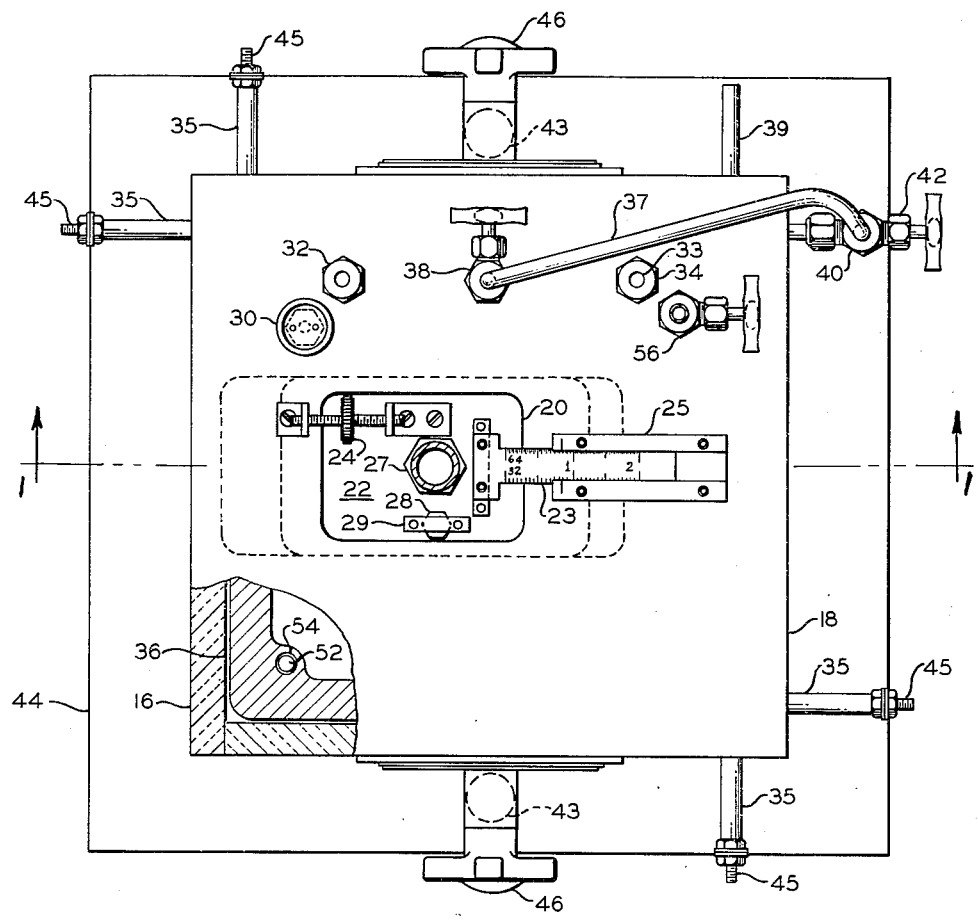
FIGURE 2 is a top view of the inventive aging and curing apparatus.

Referring to the drawings and to FIGURES 1 and 2 in particular, a circular test sample container 10 is positioned within a container holder 11. Container 10 is held firmly within holder 11 by means of spring clamps 12 operably attached to holder 11 and pressing against sample container 10 as illustrated. It is within the scope of this invention to employ other sample containers and means of firmly positioning said sample container within a sample holder than herein illustrated. A variable speed motor means 13 is operably attached to a vertical shaft means 15. Shaft means 15 is operably attached to holder 11, herein illustrated as threadably engaging holder 11, such that any rotation of shaft means 15 imparts the same rotation to holder 11 and sample container 10. Thus, upon operation of motor means 13 a rotating motion is imparted to shaft means 15 and sample container 10. A slip clutch means 14 provides a means of disengaging motor means 13 from shaft means 15. The function of slip clutch means 14 will hereinafter be described.

The test chamber housing comprises vertical side plate members 16, horizontal bottom plate member 17 and a top cover comprised of plate members 18 and 19. Plate members 18 and 19 are operably attached to each other and to side plate member 16 by a means, such as screw members, not herein illustrated. The top cover has an opening 20 and a recess 21. A horizontal plate member 22 slidably engages plate members 18 and 19, moving within recess 21. The position of platemember 22 with respect to recess 21 is adjusted by means of an adjustable thumb screw member 24, the position of plate member 22 noted by a linear scale 23 attached to said plate member 22 and in sliding contact with a recessed runway 25 attached to plate member 18. Although a box-shaped test chamber is herein illustrated, it is within the scope of this invention to provide a test chamber having another shape, such as a cylindrical-shaped test chamber.

Extending downwardly through plate member 22 is the probe assembly 26 of an instrument capable of continuously measuring the viscosity of a test sample within container 10. An instrument capable of continuously measuring the viscosity is the Bendix Ultra-Viscoson manufactured by Bendix Aviation Corporation, Cincinnati 8, Ohio. The vertical positioning of probe assembly 26 is secured by a threaded locking member 27. A means of measuring the temperature of the test sample, such as a thermocouple, extends downwardly through plate member 22 into the container, said thermocouple vertically positioned by a locking member 28 and having a terminal 29.

Extending downwardly through plate members 18 and 19 is a means of sensing the temperature of the test chamber, such as a thermistor probe 30, and transmitting a signal representative of said temperature to a means of adjusting the temperature of the test chamber by controlling the passage of an electrical current to heaters 35. A means of measuring the temperature of the test chamber, such as a mercury thermometer 31, extends downwardly through plate members 18 and 19 into the test chamber. The vertical position of the thermometer is secured by a threaded locking member 32. An opening 33 containing a threaded locking member 34 is provided in the top cover so as to provide a means whereby additional data, such as the pressure within the test chamber, can be obtained if desired. When not in use, opening 32 will be closed.

The method of heating the test chamber, as herein illustrated, employs two electric heaters 35, shown in FIGURE 3. The heaters 35 are contained within an inner heat conductive wall member 36. To reduce the loss of heat to the atmosphere, plate members 18, 19, 16 and 17 are preferably fabricated from heat insulating materials. Although electrical heaters are herein illustrated, it is within the scope of this invention to employ other means of heating the test chamber, such as steam. Utilizing two heaters in the illustrated manner provides a means of rapidly raising the temperature of the test chamber and after the test temperature has been obtained, utilizing only one heater to maintain the desired test temperature.

A gas is passed to the test chamber via conduit means 37, said conduit means 37 extending downwardly through plate members 18 and 19 into container 10. The rate of gaseous flow to container 10 is controlled by a valve means 38. The gas passed to the testing chamber can be preheated by passing the gas to conduit 39 positioned within inner wall member 36 and from conduit 39 to conduit 37 via T-member 40. If preferred, the gas can be passed to conduit 37 via valve means 42, T-member 40 and conduit means 41.

Referring to FIGURES 1, 2 and 4, the test chamber is supported by vertical support members 43 operably attached to and bearing upon supporting plate member 44. Upon loosening thumb friction holding screws 46, the test chamber can be rotated to a position between the normal perpendicular and horizontal planes. Upon tightening thumb screws 46, the test chamber can be maintained at the inclined position. The angle of the inclination is indicated by protractor means 47.

Bottom plate member 17 is operably attached to side plate members 16 by means of latch members 49. Upon moving the latch members 49 to the release position, the test apparatus can be disassembled by lowering plate member 17 until plate member 17, container 10, holder 11, and motor means 13 are supported by vertical support members 50 bearing upon support plate member 44. To effectively disassemble the test apparatus with the test chamber in the vertical position, it is required that the position of the test chamber above the support plate member 44 be at an elevation to permit the lowering of plate member 17 to a position so that container 10 containing the test sample can be removed from the test chamber, and another sample placed in the container. Motor means 13 is operably attached to, and supported by plate member 17, by means of a support bracket member 51.

To facilitate the assembly and disassembly of the test apparatus, four guide pins 52, one at each corner of plate member 53, are attached to and extend upwardly from plate member 53 through guide channels 54, said guide channels 54 extending upwardly through inner wall member 36. Pin members 52 should be of sufficient length that when plate member 17 is lowered to the position of disassembly, the upper extended portion of pin members 51 will extend upwardly into pin guide channels 54 within inner wall member 36.

In operation, the illustrated test apparatus containing a test sample is pivoted to the desired angle (inclined from the normal perpendicular plane) of operation. The elevated temperature of the test chamber is controlled, the temperature employed dependent upon the sample and the length of the test. Container 10 is continuously rotated, thereby continuously forming a film upon the inner wall of container 10. The test chamber is operated at an angle to permit effective continuous contact between the probe assembly and the test sample. Also, continuous effective contact is maintained between the thermocouple measuring the temperature of the test sample and the test sample.

As previously noted, a gas such as air or nitrogen can be transmitted to container 10 via conduit means 37. The gas is withdrawn from the test chamber via conduit means 55 and valve means 56. By passing the gas to the test chamber and removing the gas from the test chamber in the described manner, volatile vaporized constituents of the test sample are continuously removed from the test chamber upon vaporization. The temperature of the gas passed to the test chamber can be readily controlled by placing a thermocouple in conduit 37 and opening or closing valve 42 responsive to the temperature in conduit 37, thereby mixing the preheated gas and the cooled gas in the proper proportion to provide a gas at a desired temperature.

As will be evident to those skilled in the art, various modifications of this invention can be made, or followed, in the light of the foregoing disclosure and discussion without departing from the spirit or the scope thereof.

We claim:

1. Apparatus comprising, in combination, a test chamber pivotable about and supported by a horizontal axis, a rotatable member within said test chamber, means of rotating said rotatable member about an axis perpendicular to said horizontal axis when said test chamber and said rotatable member are in an inclined position, said means of rotation comprising an adjustable speed rotation means operably attached to and in fixed relationship to said test chamber, a sample container operably attached to and in fixed relationship to said rotatable member, means of continuously measuring the viscosity and the temperature of a liquid sample contained within said sample container, and means of controlling the temperature of said test chamber.

2. Apparatus of claim 1 to include first conduit means of transmitting a gas to said sample container, second conduit means of transmitting said gas from said test chamber, and means of heating said gas flowing through said first conduit means.

3. A test chamber comprising, in combination, a top cover operably attached to and in fixed relationship to a vertical side plate member, a bottom plate member positioned adjacent to and in a plane perpendicular to said vertical side plate member, latching means operably attached to said vertical side plate member and to said bottom plate member, said latching means positioned outside said test chamber and providing a means of opening and closing said test chamber by the removal of said bottom plate member, pin members attached in fixed relationship to and extending upwardly from said bottom plate member, and channel means positioned within said vertical side plate member so as to contain said pin members with said bottom plate member in a closed position.

4. The test chamber of claim 3 wherein said top cover comprises two adjacent parallel horizontal plate members, a third horizontal plate member adjustably positioned between said adjacent horizontal plate members and slidably engaging each of said adjacent horizontal plate members, and at least one opening in each of said horizontal plate members.

5. Apparatus comprising, in combination, the test chamber of claim 4, said test chamber pivotal about a horizontal axis, a rotatable member within said test chamber, means of rotating said rotatable member about an axis perpendicular to said horizontal axis when said test chamber and said rotatable member are in an inclined position, and means of controlling the temperature of said test chamber.

6. Apparatus of claim 5 to include a sample container operably attached to and in fixed relationship to said rotating member.

7. Apparatus of claim 6 to include means of continuously measuring the viscosity and the temperature of a sample contained within said sample container.

8. Apparatus of claim 7 to include first conduit means of transmitting a gas to said sample container, a second conduit means of transmitting said gas from said test chamber, and means of heating said gas flowing through said first conduit means.

9. The apparatus of claim 8 wherein said means of rotating and means of pivoting capable of continuously providing a thin film of a liquid sample upon the inner wall of said container.

10. Apparatus comprising, in combination, a test chamber, a rotatable member within said test chamber, means of pivoting said rotatable member about a horizontal axis, means of rotating said rotatable member about an axis perpendicular to said horizontal axis when said rotatable member is in an inclined position, a sample container operably attached to and in fixed relationship to said rotatable member, and means of continuously measuring the viscosity of a liquid sample contained within said sample container.

11. The apparatus of claim 10 wherein said means of rotating and means of pivoting capable of continuously providing a thin film of said liquid sample upon the inner wall of said container.

References Cited by the Examiner

UNITED STATES PATENTS

| | | | |
|---|---|---|---|
| 1,746,791 | 2/30 | Osborne | 73—60 |
| 2,027,903 | 1/36 | Dintilhac | 73—60 |
| 2,079,247 | 5/37 | Eckstein | 73—59 |
| 2,116,617 | 5/38 | Cremer | 73—54 X |
| 2,365,339 | 12/44 | Green | 73—59 |
| 2,480,502 | 8/49 | Nieder | 134—118 |
| 2,748,597 | 6/56 | Kooistra | 73—15.6 |
| 2,817,231 | 12/57 | Barstow | 73—60 |
| 2,832,215 | 4/58 | Brabender | 73—76 |

RICHARD C. QUEISSER, *Primary Examiner.*

DAVID SCHONBERG, *Examiner.*